United States Patent [19]

Rubenzer

[11] 4,162,565
[45] Jul. 31, 1979

[54] PRESS BRAKE MILLING MACHINE

[76] Inventor: Jon A. Rubenzer, 5468 Glennan Ct., San Jose, Calif. 95129

[21] Appl. No.: 890,070

[22] Filed: Mar. 27, 1978

[51] Int. Cl.² .................. B23C 7/00; B23Q 11/00
[52] U.S. Cl. ........................... 29/33 R; 51/241 S; 409/178
[58] Field of Search .................. 90/12 R, 12 D, 15 R, 90/16, 17; 83/174, 174.1; 51/241 G, 241 S, 249; 144/134 B, 134 C; 29/33 R

[56] References Cited

U.S. PATENT DOCUMENTS

| | | | |
|---|---|---|---|
| 3,060,813 | 10/1962 | Zavick | 90/15 R |
| 3,650,178 | 3/1972 | Appleton | 90/15 R |
| 3,762,273 | 10/1973 | Sprung | 90/15 R |
| 3,935,788 | 2/1976 | Gilmore | 90/12 R |

FOREIGN PATENT DOCUMENTS 644249 6/1928 France ............................ 90/17

*Primary Examiner*—Z. R. Bilinsky
*Attorney, Agent, or Firm*—Jack M. Wiseman

[57] ABSTRACT

A press brake milling machine comprising an upper way, a lower way and a carriage. The upper way includes a rail on which the upper carriage support shoes ride, and a rack for meshing with the gears of a carriage drive for advancing the carriage along the length of the upper way. The lower way includes a rail on which the lower carriage support shoes ride and a rack for meshing with the gears of the carriage drive for advancing the carriage along the length of the lower way. The upper way is attached to the upper moving slide member of the press brake and the lower way is attached to the lower bed member of the press brake. Mounted on the carriage is a cutter and a cutter drive. The carriage traverses the length of the press brake. While the carriage moves along the length of the upper moving slide member and the lower bed member, the cutter machines either the tool holding edge of the upper moving slide member or the tool holding edge of the lower bed member to straighten the edges thereof. The cutter head is reversibly positioned on the cutter for selecting the tool holding edge to be milled.

11 Claims, 4 Drawing Figures

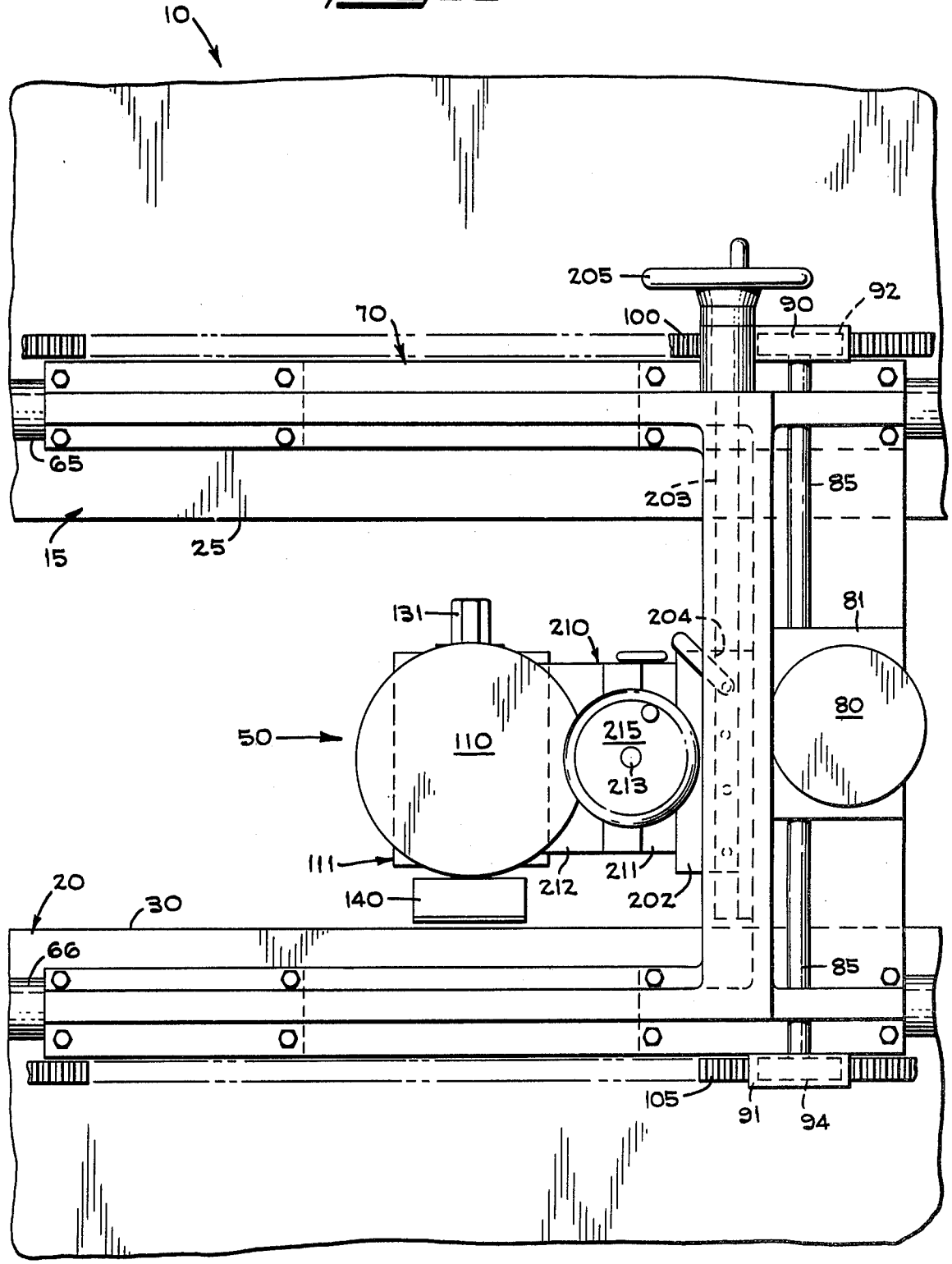

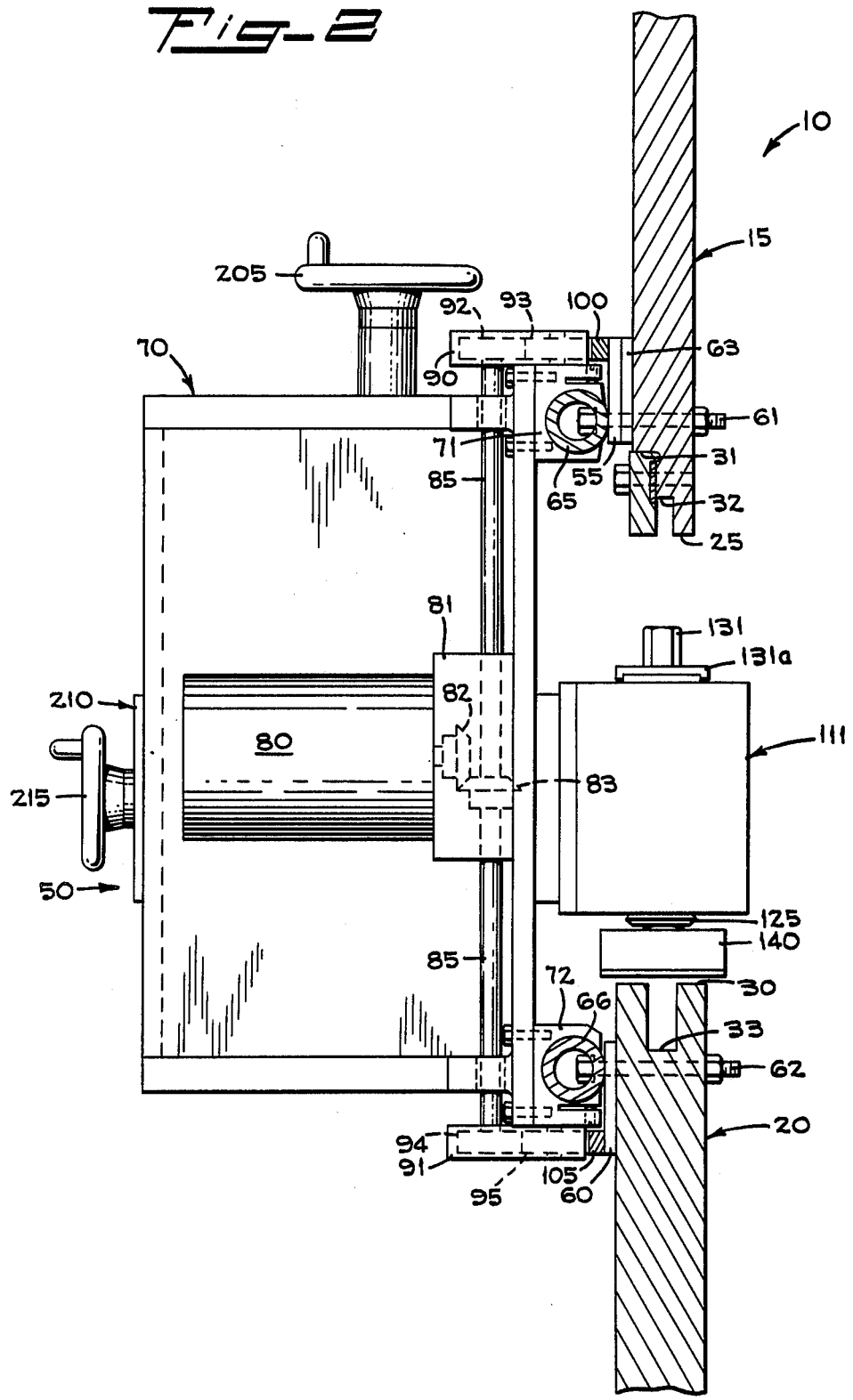

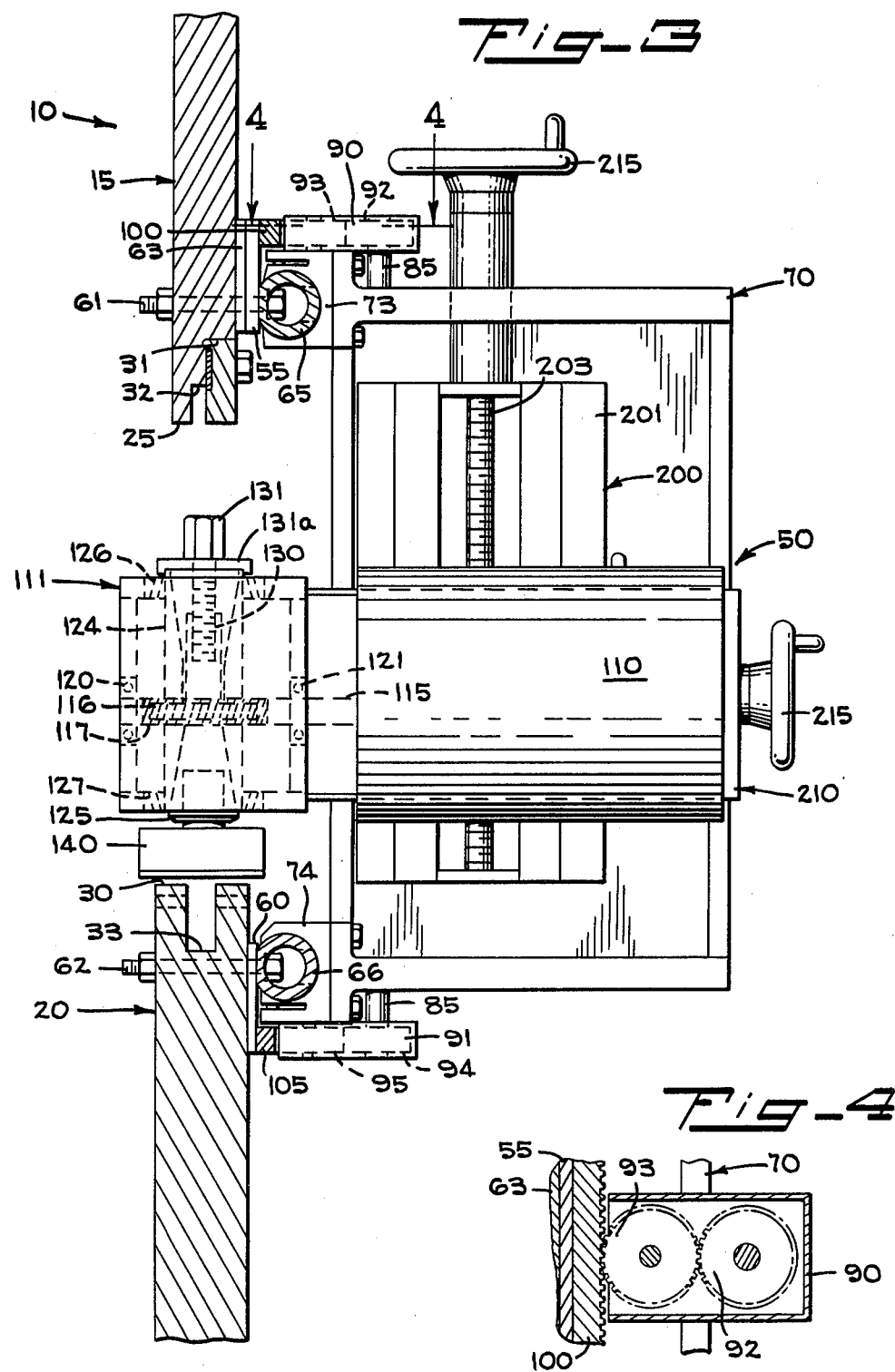

PRESS BRAKE MILLING MACHINE

BACKGROUND OF THE INVENTION

The present invention relates in general to milling machines, and more particularly to a press brake milling machine for straightening the tool holding edges of a press brake.

In a press brake machine, the upper moving slide member and the lower bed member hold and support the tooling which bends the workpiece to a desired configuration. The upper moving slide member and the lower bed member of a press brake become malformed from use. When the edges of the press brake that hold the tooling are stressed beyond their elastic limit, they become bent or bowed. As a consequence thereof, the press brake is worn and loses accuracy. When this condition exists, the tooling has voids or spaces along its length during the operation of the press brake. Generally, there is more space at the center of the edges than at the ends of the edges.

The U.S. patent to Gilmore, No. 3,935,788, issued on Feb. 3, 1976, discloses a portable milling machine for milling rectangular doors. The milling machine includes a frame, which is bolted to a workpiece to be machined. Supported by the frame are longitudinally extending tracks for longitudinal movement. A motor and pulley drive rotate longitudinally extending threaded shafts to impart longitudinal movement to the carriages along the tracks. The carriages support transversely extending tracks. Movable along the transverse tracks is a carrier on which is mounted a milling cutter. A motor rotates transversely extending threaded shafts to move the carrier in the transverse direction along the transverse tracks. A motor rotates the cutter head through a threaded shaft for moving the cutter head in its axial direction.

In the U.S. patent to Zavick, No. 3,060,813, issued on Oct. 30, 1962, there is disclosed a stand on which is clamped a workpiece. The stand supports a carriage for horizontal movement. Mounted on the carriage is a gear case that has vertical movement relative to the carriage. A spindle is mounted on the gear case and supports a milling tool for axial movement and rotation. Thus, the milling tool has adjustable movement in three mutually perpendicular directions.

In the U.S. patent to Sprung, No. 3,762,273, issued on Oct. 2, 1973, there is disclosed a milling machine for plate edge preparation. A workpiece is supported by a centrally located table so that the plate edges of the workpiece extend longitudinally. On each side of the work table are located tracks. A carriage rides along each set of rails. Thus, there are a pair of transversely-spaced carriages to travel along the longitudinal edges of the workpiece. A motor driven worm screw shaft drives each carriage in the longitudinal direction. On each carriage is an adjustably slidable mill head base. Thus, the mill head base has transverse movement relative to the carriage. A motor driven mill head is secured to each base and has a cutter blade to mill the longitudinal edge of the workpiece. Thus, there are confronting cutter blades to mill parallel longitudinal edges of a workpiece simultaneously. Each cutter blade has longitudinal and transverse movement relative to the workpiece.

SUMMARY OF THE INVENTION

A milling machine for a press brake comprising an upper way, a lower way and a carriage. The upper way is attached to the upper moving slide member of the press brake and the lower way is attached to the lower bed member of the press brake. The upper way includes means along which the upper carriage support shoes travel. The lower way includes means along which the lower carriage support shoes travel. Mounted on the carriage is a cutter. While the carriage travels along the press brake, the cutter machines an edge of the press brake.

By attaching the upper way of the milling machine to the upper moving slide member of the press brake and by attaching the lower way of the milling machine to the lower bed member of the press brake, alignment is maintained to assure machining accuracy by the cutter of the milling machine.

The cutter is mounted on the carriage for adjustment vertically and horizontally. The carriage traverses the length of the slide member and the bed member of the press brake. Thus, the cutter, in effect, has three movements in three directions.

Additionally, the cutter head is reversibly positioned on the cutter for selecting the edge to be milled. During a lengthwise movement along the press brake, the cutter either mills an edge of the upper moving slide member or an edge of the lower bed member.

DESCRIPTION OF THE DRAWINGS

FIG. 1 is a front elevation view of a press brake milling machine embodying the present invention mounted on a conventional press brake.

FIG. 2 is a right side elevation view of the press brake milling machine shown in FIG. 1 mounted on the conventional press brake.

FIG. 3 is a left side elevation view of the press brake milling machine shown in FIGS. 1 and 2 mounted on the conventional press brake.

FIG. 4 is a fragmentary elevation view taken along line 4—4 of FIG. 3 to illustrate a transverse drive assembly.

DESCRIPTION OF THE PREFERRED EMBODIMENT

The conventional press brake 10 includes an upper moving slide member 15 and a lower bed member 20. The upper moving slide member 15 includes a tool holding edge 25 and the lower bed member 20 includes a tool holding edge 30. It is the upper moving slide member 15 and the lower bed member 20 that hold and support the tooling which bends the workpiece to the desired form. It is the tool holding edge 25 of the upper moving slide member 15 and the tool holding edge 30 of the lower bed member 20 that engage the tooling to be held by the upper moving slide member 15 and the lower bed member 20. Thus, it is the tool holding edges 25 and 30 that require the milling operation. In addition to the tool holding edges 25 and 30, edges 31, 32 and 33 may also require machining. The edges 31 and 33 may require machining depending on the condition of the upper slide member 15. Edge 32 is a tool holding edge and, hence, will require machining. The machining of the edge 32 will require a smaller diameter cutter.

The press brake milling machine 50 embodying the present invention serves to straighten edges, such as the tool holding edges 25 and 30, and reduce a bent or bowed configuration that may result from the metal being used or stressed beyond its elastic limit. The press brake milling machine 50 comprises an upper way 55 and a lower way 60. The upper way 55 is secured to the upper slide member 15 by suitable means, such as nuts and bolts 61. The lower way 60 is secured to the lower bed member 20 by suitable means, such as nuts and bolts 62. Eighteen bolts are typically used on an eight-foot brake. Thus, in the exemplary embodiment, there are nine bolts for securing the upper way to an eight-foot press brake and there are nine bolts for securing the lower way to an eight-foot press brake. The bolt locations for attaching the upper and lower ways may be located to coincide with the holes generally drilled in the upper slide member and the lower bed member for a conventional press brake. Shims 63 may be placed between the upper way 55 and the upper slide member 15 to assure that the centerline of the upper way 55 is directly above the centerline of the lower way 60. Shims, not shown, may also be used for mounting the lower way 60 to assure proper location and alignment.

The upper way 55 includes a suitable rail 65, which is fixed to the flat bed or base of the upper way 55 by suitable means, such as bolts, not shown. Similarly, the lower way 60 includes a suitable rail 66, which is fixed to the flat bed or base of the lower way 60 by suitable means, such as bolts, not shown. The rails 65 and 66 extend in parallel relation along the length of the upper slide member 15 and the lower bed member 20, and have generally cylindrical cross-sectional areas. Other configurations may be used equally as well. For example, the rails could be formed with rectangular cross-sectional areas.

Movable along the rails 65 and 66 is a suitable carriage 70, which has a frame-type structure. The carriage 70 includes shoes 71–74 (FIGS. 2 and 3) which are secured to the frame of the carriage 70 by suitable means, such as screws. The upper shoes 71 and 73 are formed with a semi-cylindrical wall to ride along the rail 65 and in a similar manner, the lower shoes 72 and 74 are formed with a semi-cylindrical wall to ride along the rail 66. Should the rails have other configurations, then, of course, the shoes are shaped to accommodate the configuration of the rails.

Mounted on the carriage 70 is a suitable variable speed, reversible drive motor 80. Also fixed to the carriage 70 is a gear box or housing 81. The housing 81 may have incorporated therein suitable speed reduction gears, not shown. Mounted in the housing 81 for rotation are conventional bevel gears 82 and 83 having their axes disposed at right angle to one another, such as in miter gears. The bevel gear 82 is fixed to the drive shaft of the drive motor 80 for rotation therewith and the bevel gear 83 is fixed to a vertical shaft 85 to impart rotation thereto. The shaft 85 is journalled in the carriage 70 for rotation.

Fixed to the carriage 70 at opposite ends of the shaft 85 are gear housings 90 and 91. Disposed within the housing 90 and fixed to the shaft 85 for rotation therewith is a drive gear 92. Meshing with the gear 92 and disposed within the housing 90 is a pinion or driven gear 93. Disposed within the housing 91 and fixed to the shaft 85 for rotation therewith is a drive gear 94. Meshing with the gear 94 and disposed within the housing 91 is a pinion or driven gear 95. Fixed to the upper way 55 by suitable means, such as bolts, not shown, is a rack 100 that extends along the length thereof. Similarly fixed to the lower way 60 is a rack 105 that extends along the length thereof. The rack 105 is secured to the lower way 60 by suitable means, such as bolts, not shown. The pinions 93 and 95 mesh with the teeth of the racks 100 and 105, respectively. The rotation of the shaft 85 imparts rotation to the pinions 93 and 95 to cause the carriage 70 to travel in one direction along the lengths of the upper slide member 15 and the lower bed member 20. Reversing the direction of rotation of the shaft 85 imparts rotation to the pinions 93 and 95 to cause the carriage 70 to travel in an opposite direction. The rack and pinion drive assemblies are similar. A more detailed view of the rack 100 and the pinion 93 is shown in FIG. 4.

Also mounted on the carriage 70 for movement therewith is a cutter drive motor 110, which is a conventional variable speed, reversible motor. Fixed to the carriage 70 for movement therewith is a cutter head cage 111 (FIG. 3). Fixed to the drive shaft 115 of the motor 110 and disposed within the cage 111 is a worm gear 116. Meshing with the worm gear 116 within the cage 111 is a gear 117 that rotates about a vertical axis. Suitable worm gear shaft bearings 120 and 121 are supported by the cage 111. Attached to the gear 117 for rotation therewith and disposed along the axis thereof is a collet holder 124 in which is removably disposed a collet 125. The collet holder 124 is journalled for rotation about its vertical axis within the cage 111 by tapered roller bearings 126 and 127. The collet holder 124 has a cylindrical outer wall. The inner wall of the collet holder 124 has a tapered configuration in which the tapered wall gradually increases in thickness from either end toward the axial center thereof. The collet 125 is removably carried by the collet holder 124 for rotation therewith.

At one end thereof, the collet or cutter head holder 125 has a threaded bore 130, which receives in threaded engagement a bolt 131 for retaining the collet 125 in a selected position within the cage 111, while permitting the collet 125, the collet holder 124 and the gear 117 to rotate about their vertical axes. At the opposite end of the collet or cutter head holder 125, a suitable cutter head 140 is gripped within a bore of the collet or cutter head holder 125 in a weall-known manner for rotation with the collet 125. In this manner, the cutter head 140 is detachably secured to the collet 125. As shown in FIGS. 1–3, the cutter head 140 travels along the length of the lower bed member 20 to mill the tool holding edge 30 of the press brake 10.

Should it be desired to mill the tool holding edge 25 of the press brake 10, the bolt 131 and a washer 131a are removed and the collet 125 is rotated about its horizontal axis to be positioned in a reverse direction in the cage 111 so that the cutting head 140 faces the tool holding edge 25. The bolt 131 is again received by the bore 130 and the washer 131a is suitably positioned to retain the collet 125 in a selected position about its horizontal axis in the cage 111. The bolt is suitably tightened to hold the collet 125 in the selected position about its horizontal axis relative to the cage 111. Now, the cutter head 140 travels along the length of the upper slide member 15 to mill the tool holding edge 25 of the press brake 10. As previously described, the edges 31, 32 and 33 may also be suitably milled in the above-described manner.

A manual adjustment of the cutter head 140 in a vertical direction is provided by a slide assembly 200. The slide assembly 200 includes a base 201 that is bolted to the carriage 70. In addition, the slide assembly 200 includes a carrier 202 that is movable along the base 201 in a vertical direction. Received by the base 201 is a threaded shaft 203. The shaft 203 is journalled for rotation by the base 201 in a fixed axial position. The carrier 202 has a threaded bore 204 which receives the threaded shaft 203 in threaded engagement. A hand wheel 205 is fixed to the end of the shaft 203 to impart rotation thereto. Rotation of the shaft 203 within the threaded base 204 of the carrier 202 causes the raising and lowering of the carrier 202 relative to the carriage 70.

A manual adjustment of the cutter head 140 in a horizontal direction is provided by a slide assembly 210, which is similar in construction to the slide assembly 200. The slide assembly 210 includes a base 211. The base of the slide assembly 211 is fixed to the carrier 202 of the slide assembly 200 by suitable means, such as bolts. Thus, the slide assembly 210 moves vertically with the carrier 202 of the slide assembly 200. The slide assembly 210 also includes a carrier 212. The cutter drive motor 110 and the cutter head 140 are fixed to the carrier 212 of the slide assembly 210 by suitable means, such as bolts.

Received by the base 211 is a threaded shaft 213. The threaded shaft 213 is journalled for rotation by the base 211 in a fixed axial position. The carrier 212 has a threaded bore which receives the threaded shaft 213 in threaded engagement. A hand wheel 215 is fixed to the end of the shaft 213 to impart rotation thereto. Rotation of the shaft 213 within the threaded base of the carrier 212 causes the carrier 212 to move horizontally in either direction relative to the carrier 212 and the carriage 70, depending on the direction of rotation of the hand wheel 215.

From the foregoing, it is to be observed that rotation of the hand wheel 205 raises or lowers the cutter drive motor 110 and the cutter blade 140 relative to the carriage 70. Rotation of the hand wheel 215 will move the cutter drive motor 110 and the cutter head 140 horizontally relative to the slide assembly 200 and the carriage 70. Suitable levers, such as lever 216, are attached to the carriers, respectively, to lock the carriers in the adjusted vertical and horizontal positions.

I claim:

1. A combination milling machine and press brake, said press brake comprising an upper slide member having an edge and a lower bed member having an edge disposed in parallel relation with said upper slide member, said milling machine comprising:
    (a) an upper way attached to said upper slide member;
    (b) a lower way attached to said lower bed member in parallel relation with said upper way;
    (c) a carriage engaging said upper way and said lower way to be moved therealong;
    (d) means on said carriage for advancing said carriage along said upper way and said lower way; and
    (e) a cutter mounted on said carriage for movement therewith and disposed in engagement with an edge of said press brake for milling the edge in engagement therewith.

2. A combination milling machine and press brake as claimed in claim 1 wherein said upper way has a rail extending therealong, said lower way has a rail extending therealong in parallel relation with said rail of said upper way, and said carriage has shoes that ride along said rails for moving said carriage along said upper way and said lower way.

3. A combination milling machine and press brake as claimed in claim 2 wherein said upper way has a rack extending therealong, said lower way has a rack extending therealong in parallel relation with said rack of said upper way, and said means includes a drive assembly with pinions meshing with said racks respectively for advancing said carriage along said upper way and said lower way.

4. A combination milling machine and press brake as claimed in claim 3 wherein said drive assembly includes a reversible drive motor, a gear assembly actuated by said drive motor, and a shaft rotated by said gear assembly, said pinions being rotatable in response to the rotation of said shaft.

5. A combination milling machine and press brake as claimed in claim 4 wherein said cutter comprises:
    (a) a cutter head for engaging an edge for milling the same;
    (b) a cutter head holder having a vertical axis and a horizontal axis, said cutter head holder gripping said cutter head for rotation therewith about the vertical axis of said cutter head holder, said cutter head projecting out of one end of said cutter head holder;
    (c) means for rotating said cutter head holder about its vertical axis; and
    (d) means for retaining said cutter head holder in a selected position about its horizontal axis, said cutter head holder being disposed in a selected position about its horizontal axis for said cutter head at times to engage the edge of said upper slide member and at other times to engage the edge of said lower bed member.

6. A combination milling machine and press brake as claimed in claim 5 wherein said means for rotating said cutter head holder comprises:
    (a) a cutter drive motor having a worm gear shaft; and
    (b) a driven gear rotatable about a vertical axis meshing with said worm gear shaft to be rotated thereby, said driven gear having an axial opening in which is disposed said cutter head holder and being secured to said cutter head holder for imparting rotation to said cutter head holder about the vertical axes of said driven gear and said cutter head holder.

7. A combination milling machine and press brake as claimed in claim 6 wherein said cutter drive motor includes a housing, said cutter head holder being formed with a threaded bore along its vertical axis at an end opposite from the end from which projects the cutter blade, and said means for retaining said cutter head holder in a selected position about its horizontal axis comprises:
    (a) a cage secured to said cutter drive motor housing, said cage journalling said cutter head holder for rotation about its vertical axis; and
    (b) means received by said bore of said cutter head holder in threaded engagement and engageable with said cage for retaining said cutter head holder in a selected position about its horizontal axis.

8. A combination milling machine and press brake as claimed in claim 7 and comprising means interconnecting on said carriage and said cutter for moving said cutter in a vertically and horizontally adjusted position relative to said carriage.

9. A combination milling machine and press brake as claimed in claim 1 wherein said cutter comprises:
    (a) a cutter head for engaging an edge for milling the same;

(b) a cutter head holder having a vertical axis and a horizontal axis, said cutter head holder gripping said cutter head for rotation therewith about the vertical axis of said cutter head holder, said cutter head projecting out of one end of said cutter head holder;

(c) means for rotating said cutter head holder about its vertical axis; and (d) means for retaining said cutter head holder in a selected position about its horizontal axis, said cutter head holder being disposed in a selected position about its horizonal axis for said cutter head at times to engage the edge of said upper slide member and at other times to engage the edge of said lower bed member.

10. A combination milling machine and press brake as claimed in claim 9 wherein said means for rotating said cutter head holder comprises:

(a) a cutter drive motor having a worm gear shaft;

(b) a driven gear rotatable about a vertical axis meshing with said worm gear shaft to be rotated thereby, said driven gear having an axial opening in which is disposed said cutter head holder and being secured to said cutter head holder for imparting rotation to said cutter head holder about the vertical axes of said driven gear and said cutter head holder.

11. A combination milling machine and press brake as claimed in claim 10 wherein said cutter drive motor includes a housing, said cutter head holder being formed with a threaded bore along its vertical axis at an end opposite from the end from which projects the cutter blade, and said means for retaining said cutter head holder in a selected position about its horizontal axis comprises:

(a) a cage secured to said cutter drive motor housing, said cage journalling said cutter head holder for rotation about its vertical axis, and (b) means received by said bore of said cutter head holder in threaded engagement and engageable with said cage for retaining said cutter head holder in a selected position about its horizontal axis.

* * * * *